(12) United States Patent
Palumbo et al.

(10) Patent No.: US 11,811,803 B2
(45) Date of Patent: Nov. 7, 2023

(54) METHOD OF THREAT DETECTION

(71) Applicant: F-Secure Corporation, Helsinki (FI)

(72) Inventors: Paolo Palumbo, Helsinki (FI); Dmitriy Komashinskiy, Helsinki (FI)

(73) Assignee: WITHSECURE CORPORATION, Helsinki (FI)

( * ) Notice: Subject to any disclaimer, the term of this patent is extended or adjusted under 35 U.S.C. 154(b) by 121 days.

(21) Appl. No.: 17/094,414

(22) Filed: Nov. 10, 2020

(65) Prior Publication Data
US 2021/0144165 A1 May 13, 2021

(30) Foreign Application Priority Data

Nov. 11, 2019 (GB) ..................................... 1916345

(51) Int. Cl.
*G06F 21/00* (2013.01)
*H04L 9/40* (2022.01)

(52) U.S. Cl.
CPC ...... *H04L 63/1425* (2013.01); *H04L 63/0218* (2013.01); *H04L 63/0254* (2013.01); *H04L 63/145* (2013.01)

(58) Field of Classification Search
CPC ............. H04L 63/1425; H04L 63/0218; H04L 63/0254; H04L 63/145; G06F 21/566; G06F 21/554; G06F 21/56
See application file for complete search history.

(56) References Cited

U.S. PATENT DOCUMENTS

| | | | | |
|---|---|---|---|---|
| 9,413,774 B1* | 8/2016 | Liu | ........................ | G06F 21/566 |
| 10,706,149 B1* | 7/2020 | Vincent | ................. | G06F 21/566 |
| 11,263,307 B2* | 3/2022 | Tumblin | ............... | G06F 18/295 |
| 2007/0056035 A1* | 3/2007 | Copley | ................. | G06F 21/562 |
| | | | | 726/22 |
| 2008/0010538 A1* | 1/2008 | Satish | .................... | G06F 21/562 |
| | | | | 714/38.13 |
| 2011/0023115 A1* | 1/2011 | Wright | .................. | G06F 21/552 |
| | | | | 726/22 |
| 2013/0276119 A1* | 10/2013 | Edwards | ............... | G06F 21/554 |
| | | | | 726/24 |

(Continued)

OTHER PUBLICATIONS

Search Report issued by the UK Intellectual Property Office for Application No. GB1916345.0 dated Aug. 6, 2020.

(Continued)

*Primary Examiner* — Michael M Lee
(74) *Attorney, Agent, or Firm* — Meunier Carlin & Curfman LLC

(57) ABSTRACT

There is provided a method comprising: detecting a new process start at a network node of a computer network; determining that said process requires external code modules; observing the times at which one or more external code modules required by the new process are loaded relative to the process starting time; determining that the usage of an external code module required by the new process is anomalous when the time elapsed between the start of the process and loading of said external code module lies outside predetermined expected boundaries; and taking further action to protect the network node and/or the computer network based on determining that the usage of the external code module required by the detected new process is anomalous.

13 Claims, 2 Drawing Sheets

(56) References Cited

U.S. PATENT DOCUMENTS

| | | | |
|---|---|---|---|
| 2014/0380474 A1* | 12/2014 | Paithane | B01D 61/06 |
| | | | 726/23 |
| 2017/0039211 A1* | 2/2017 | Pottinger | G06F 16/152 |
| 2017/0220797 A1 | 8/2017 | Liu | |
| 2018/0089430 A1* | 3/2018 | Mayo | G06F 21/577 |
| 2018/0129807 A1* | 5/2018 | Azarafrooz | G06F 21/552 |
| 2018/0234435 A1* | 8/2018 | Cohen | H04L 63/1416 |
| 2019/0050561 A1 | 2/2019 | Li et al. | |
| 2019/0182272 A1 | 6/2019 | Palumbo et al. | |

OTHER PUBLICATIONS

Peng Gao et al., "SAQL: A Stream-based Query System for Real-Time Abnormal System Behavior Detection," Arxiv.Org Cornell University Library, 2018.

* cited by examiner

METHOD OF THREAT DETECTION

CROSS-REFERENCE TO RELATED APPLICATIONS

This application claims priority to, and the benefit of, United Kingdom Patent Application No. 1916345.0, filed Nov. 11, 2019, which is incorporated by reference herein in its entirety.

TECHNICAL FIELD

The present invention relates to a method of threat detection in a computer network security system and to a computer network security system.

BACKGROUND

Computer network security systems such as Managed Detection and Response (MDR) and Endpoint Detection and Response (EDR) products and services have become popular. These systems focus on the detection and monitoring of a breach as it occurs and after it occurs and helps to determine how best to respond. The growth of MDR/EDR has been made possible in part by the emergence of machine learning, big data and cloud computing.

EDR or other corresponding systems deploy data collectors on selected network endpoints (which can be any element of IT infrastructure). The data collectors observe activities happening at the endpoint and then send the collected data to a central, backend system ("EDR backend"), often located in the cloud. When the EDR backend receives the data, the data is processed (e.g. aggregated and enriched) before being analysed and scanned by the EDR provider for signs of security breaches and anomalies.

One problem with these systems is that attackers tend to change their tactics, techniques and procedures constantly and therefore misuse detections lack in efficiency. A known trend of the attacks is to abuse legitimate software applications and the trust in originators thereof.

Thus there is a need to improve the way in which abnormalities are detected and how complex threats such as hacking and attackers living-off-the-land, exploitation, insider threats and APTs (Advanced Persistent Threats) are controlled. There is also a need to improve detection of sophisticated threats especially in situations where this happens inside a reputable, trustworthy process/executable image.

SUMMARY

According to a first aspect of the invention there is provided a method of threat detection as specified in claim 1.

According to a second aspect of the invention, there is provided a computer apparatus as specified in claim 9.

According to a third aspect of the invention, there is provided a computer program product comprising a computer storage medium having computer code stored thereon, which when executed on a computer system, causes the system to operate as a computer apparatus according to the above second aspect of the invention.

DETAILED DESCRIPTION

Figure 1:
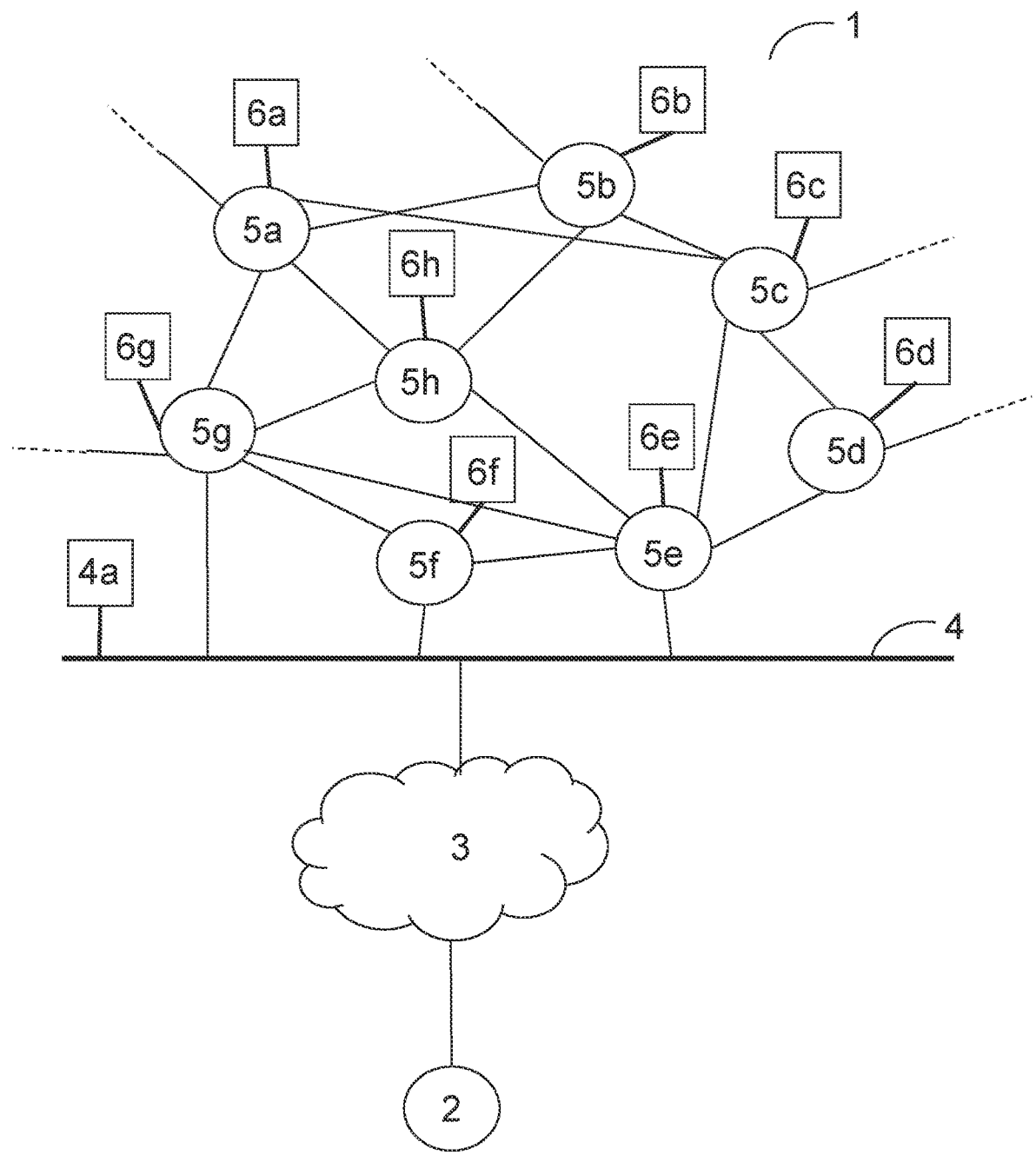
FIG. 1 illustrates schematically a network architecture.

FIG. 1 illustrates schematically a part of a first computer network 1 into which a computer system, for example an EDR system, has been installed. Also any other computer system that is able to implement the embodiments of the invention can be used instead or in addition to the EDR system used in this example. The first computer network is connected to an EDR backend 2 through the cloud 3. The EDR backend 2 forms a node on a second computer network relative to the first computer network. The second computer network is managed by an EDR system provider and may be separated from the cloud 3 by a gateway or other interface (not shown) or other network elements appropriate for an EDR backend 2. The first computer network 1 may also be separated from the cloud 3 by a gateway 4 or other interface. Other network structures are also envisaged. Although in the example of FIG. 1, the elements are illustrated as separate or combined entities, it is possible to implement each element in any other combinations whether separate and/or combined.

The first computer network 1 is formed of a plurality of interconnected network nodes 5a-5h, each representing an element in the computer network 1 such as a computer, smartphone, tablet, laptop, or other piece of network enabled hardware. Each network node 5a-5h shown in the computer network also represents an EDR endpoint onto which a data collector (or "sensor") 6a-6h has been installed. Data collectors may also be installed on any other element of the computer network, such as on the gateway or other interface. A data collector 4a has been installed on the gateway 4 in FIG. 1. The data collectors, 6a-6h, 4a collect various types of data at the network nodes 5a-5h or gateway 4 including, for example, program or file hashes, files stored at the nodes 5a-5h, logs of network traffic, process logs, binaries or files carved from memory (e.g. DLL, EXE, or memory forensics artefacts), and/or logs from monitoring actions executed by programs or scripts running on the nodes 5a-5h or gateway 4 (e.g. tcp dumps).

It is envisaged that any type of data which can assist in detecting and monitoring a security breach may be collected by the data collectors 6a-6h, 4a during their lifecycle and that the types of data which are observed and collected may be set according to rules defined by the EDR system provider upon installation of the EDR system or in response to instructions from the EDR backend 2. For example, the data collectors 6a-6h, 4a may collect data about the behaviour of programs running on an EDR endpoint and can observe when new programs are started. Where suitable resources are available, the collected data may be stored permanently or temporarily by the data collectors 6a-6h, 4a at their respective nodes or at a suitable storage location on the first computer network 1 (not shown).

The data collectors 6a-6h, 4a may also perform some simple, preliminary processing steps on the collected data but this is limited by the computing and network resources available at each network node 5a-5h or gateway 4.

The data collectors 6a-6h, 4a are set up such that they may send information such as the data they have collected or send and receive instructions to/from the EDR backend 2 through the cloud 3. This allows the EDR system provider to remotely manage the EDR system without having to maintain a constant human presence at the organisation which administers the first computer network 1.

The modules 6a-6h, 4a may be further configured to use the collected data and information received from the network for generating and adapting models related to the respective network nodes 5a-5h. For example, in case a known security threat is detected, the modules 6a-6h, 4a may be configured to generate and send a security alert to the network nodes in the local computer network and to activate security measures for responding to the detected security threat. Further, in case an anomaly that is estimated very likely to be a new threat is identified, the module 6a-6h, 4a may be configured to verify and contain the threat, generate a new threat model on the basis of the collected data and received information and share the generated new threat model in the computer network.

Figure 2:
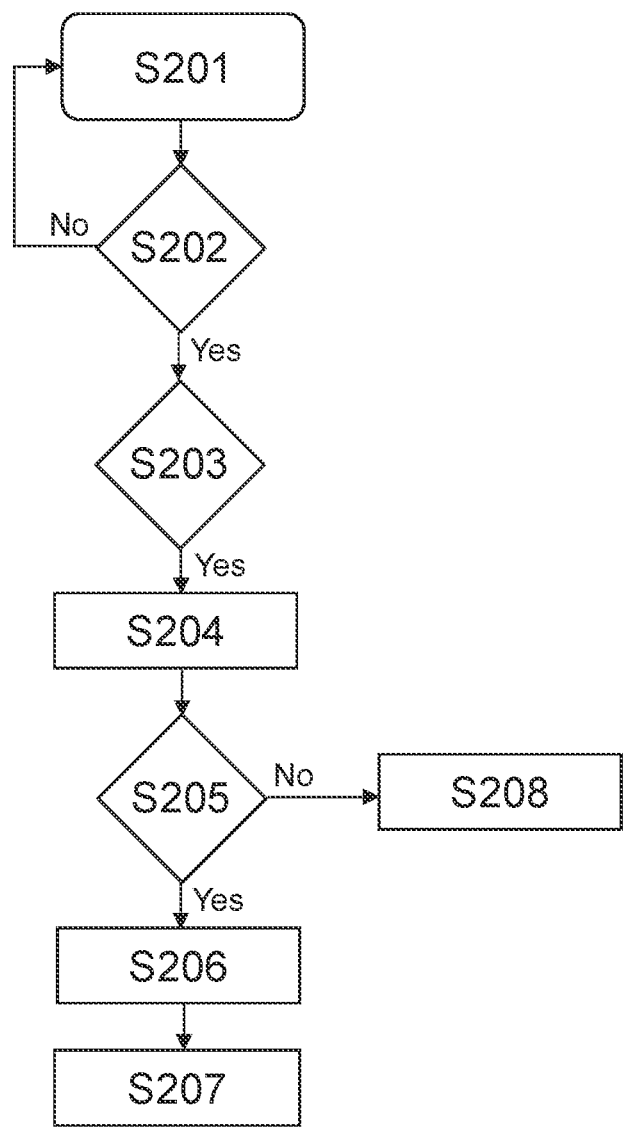
FIG. 2 is a flow diagram illustrating a method according to an embodiment.

FIG. 2 is a flow diagram illustrating a method according to an embodiment. The method steps described in this example can be processed by a security server backend, by one or more network nodes (endpoints) of a computer network or by the combination thereof.

The method starts in S201 where computer processes of a network node, such as an endpoint node of a computer network, are being monitored.

In S202, if a new process start is detected at the network node, then S203 is entered. Otherwise, S201 is remained and monitoring of the computer processes is continued.

In S203, it is determined whether the detected new process requires external code modules. In an embodiment, usage of the external code modules can be determined by using differential analysis. For example, by processing the file contents of the executable image associated with the process, a list of external code modules that could be used by this process can be retrieved. This may mean, but is not limited to, processing import tables (Import Table, Delayed Import Table, .dynsym/.dynstr sections, etc.), processing the code and extracting various artefacts (e.g. strings, resource tables, etc.).

In an embodiment, information about the new code modules being loaded and unloaded may be collected through dynamic analysis methods such as F-Secure's xDR sensor, Sandviper, debuggers, emulators or dynamic instrumentation.

In an embodiment, on every new code module load or unload the following may take place: if the code module is not in the list of expected code module load list, it is marked as a delayed (implicit) load event and the suspiciousness level of the original event is increased; if the loaded module is knowingly clean and prevalent and it is used for a specific, not mainstream purpose, the level of suspiciousness of the original event is increased again; the event is marked for further investigation.

In case in S203 it is determined that the new process requires external code modules, then S204 is entered, where the times at which one or more of the external code modules required by the new process are loaded relative to the start time of the new process are observed.

In S205, in case the time elapsed between the start of the new process and loading of the external code module lies outside predetermined expected boundaries, then S206 is entered where it is determined that the usage of the external code module required by the new process is anomalous. If the time elapsed between the start of the new process and loading of the external code module does not exceed predetermined expected boundaries, then S208 is entered where it is determined that the usage of the external code module required by the new process is not anomalous.

In S207, further action is taken to protect the network node and/or the computer network based on determining that the usage of an external code module required by the detected new process is anomalous.

In an embodiment, the detection of anomalous external module load is thus based on the process's timeline analysis. Based on detecting that the time difference between the observed times (start time of new process vs. external code module load time) exceeds a predetermined limit, a threat can be identified. Delayed external code module loads may also be detected without prior knowledge of the external code modules required by the process. For this purpose, relevant information related to past observations can be used. The realization that a similar code module is used by a similar process can be used in the determination. The similarity between processes may be defined by looking at a variety of attributes. For this purpose, it may be defined whether the file names of the executable images for these processes are sufficiently similar or if the portions of the content of the executable images are strong enough match (e.g. using SSDEEP, IMPHASH, SHA256 and similar). The similarity between code modules may also be defined by any criteria valid for executables of the process. Further, the times at which additional code modules were loaded relative to the beginning of the process execution are determined. This data can be retrieved using a dynamic analysis method, for example.

In an embodiment, the detection of delayed external code modules may be arranged by applying various machine learning anomaly detection approaches where the model may represent: time delay distributions for the process and module or similar processes and modules (time scales are to be normalized in case different dynamic frameworks/data collection approaches are applied), module usage distributions for the process or similar processes and/or process use distributions for the module or similar modules.

In an embodiment, the new process comprises the execution of one or more of: a code module, a dynamic load library, a shared object.

In an embodiment, the method further comprises determining whether the related executable image for the new process is known clean by determining whether the executable image satisfies one or more predetermined whitelisting criteria. In an embodiment, for those processes whose associated executable image is known clean, i.e. the executable image satisfies one or more explicit whitelisting criteria (e.g. a file bearing a valid Authenticode signature from a vetted, trustworthy manufacturer or a file being a part of a major operating system), it is determined whether the usage of external code modules for this process is anomalous or not. This determination may be implemented in a variety of different ways as described above.

In an embodiment, the method further comprises processing the file contents of the related executable image for retrieving a list of expected external code modules that could be used by the new process. Processing the file contents may comprise one or more of: processing the import tables, processing code, extracting various artefacts.

In an embodiment, the method further comprises collecting information about new code modules being loaded or unloaded and in relation to every new code module load or unload the method further comprises increasing the level of suspiciousness of the new process if the new code module load/unload is not in the list of expected external code modules.

In an embodiment, the step of determining whether the usage of an external code module required by the new process is anomalous is further based on determining that the external code module required by the new process belongs to a group of known processes having sufficiently similar properties on the basis of comparing file names of the executable images for the processes and/or comparing portions of the content of the executable images for the processes.

In an embodiment, the step of taking further action to secure the computer network and/or any related network node comprises one or more of the list of: preventing one or more of the network nodes from being switched off, switching on a firewall at one or more of the network nodes, warning a user of one or more of the network nodes that signs of a security breach have been detected, and/or sending a software update to one or more of the network nodes.

In an embodiment, the further actions taken based on determining that the usage of an external code module required by the new process is anomalous, may include taking immediate action by changing the settings of the network node(s) in order to ensure an attacker is stopped and any traces of their activity is not destroyed. Changing the settings may include, for example, one or more nodes (which may be computers or other devices) being prevented from being switched off in order to preserve information in RAM, a firewall may be switched on at one or more nodes to cut off the attacker immediately, users of the one or more nodes may be warned that a breach has been detected and that their workstation is under investigation, and/or a system update or software patch may be sent from the EDR backend 2 to the nodes in response to detecting a sign of a breach. It is envisaged that one or more of these actions may be initiated automatically by the above-described algorithms. For example, using the above described methods, data may be collected and sent from the nodes in the computer network 1 to the EDR backend 2. The analysis algorithm has determined that a threat was detected. As soon as the algorithm makes the determination that a sign of a threat was detected, it may generate and issue a command to the related network nodes without human intervention to automatically initiate one or more of the above-described actions at the nodes. By doing this, a possible breach can be stopped and/or the damage minimised automatically at very high speeds and without human intervention.

Generally, the proposed approach introduces a number of improvements to conventional threat detection schemes. Such improvements comprise, for example, being able to detect sophisticated threats that load code dynamically at a later stage of execution and especially in situations where this happens inside a reputable, trustworthy process or executable image.

Another improvement according to an embodiment is that anomalous and potentially malicious activity can be detected based on the timing of dynamic code loads. This is beneficial especially in situations where the entities under monitoring are trusted and other data is lacking or too expensive to compute. Thus, the invention provides a highly effective threat detection scheme while at the same time enabling reducing the amount of data required in threat detection and consequently saving resources of the computer system and saving costs.

Further, since the proposed threat detection scheme is able to detect anomalies in how external modules are being used, it is extremely helpful for example in cases such as recently seen supply chain attacks and in cases where shellcode or external payloads are used by the attackers.

Any suitable computer network system, servers, endpoint nodes/devices and computer apparatus, as described herein each may perform or contribute to the threat detection method according to the embodiments of the invention. The processors of such systems are configured to execute computer program instructions based on the methods and processes described herein, such instructions being contained in a non-transitory computer-readable medium, such as memory. The computer program instructions may be read into memory from another computer-readable medium or from another device via a communication interface. The instructions contained in memory cause the processor of a computer apparatus to perform processes or methods as described herein. Alternatively, or in addition to, hardwired circuitry may be used in place of or in combination with the computer program instructions to implement processes and methods consistent with the present invention. Examples of hardware circuitry may include, but are not limited to, semiconductor chips, integrated circuits, field programmable gate arrays, application-specific integrated circuits, electronically programmable integrated circuits and the like. Thus, the present invention is not limited to any specific combination of hardware circuitry and/or software.

The non-transitory computer readable medium may include computer program instructions stored thereon, which when executed on one or more processors of a server, server system, or other computing system, performs the processes or method steps of threat detection and taking further action to protect the network node and/or the computer network based on determining that the usage of the external code module required by the new process is anomalous as described herein with reference to FIGS. 1-2.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination, with any other feature disclosed or illustrated herein.

The invention claimed is:

1. A method of threat detection, the method comprising:
   detecting a new process that starts at a network node of a computer network;
   determining that said new process requires external code modules by processing file contents of an executable image associated with said new process to retrieve a list of expected external code modules for the new process, wherein the list includes all external code modules that are used by the new process;
   observing the times at which one or more of the external code modules in the list of expected external code modules for the new process are loaded relative to a start of the new process;
   determining whether one or more external code modules that are not in the list of expected code modules for the new process are loaded;
   determining that usage of an external code module is anomalous when the time elapsed between the start of the new process and loading of said external code module lies outside predetermined expected boundaries or said external code module was determined to be not in the list of expected code modules for the new process; and
   taking further action to protect the network node and/or the computer network based on the determining that the usage of the external code module is anomalous.

2. The method according to claim 1, wherein the new process comprises execution of one or more of: a code module, a dynamic load library, a shared object.

3. The method according to claim 1, further comprising determining whether a related executable image for the new process is known clean, wherein the determining whether the related executable image for the new process is known clean comprises determining whether the executable image satisfies one or more predetermined whitelisting criteria.

4. The method according to claim 1, wherein the processing the file contents of the executable image comprises one or more of: processing import tables, processing code, extracting various artefacts.

5. The method according to claim 1, wherein the determining whether the usage of an external code module is anomalous is further based on determining that the external code module belongs to a group of known processes having sufficiently similar properties on the basis of comparing file names of executable images for new processes and/or comparing portions of the file contents of the executable images for the new processes.

6. The method according to claim 1, wherein the taking further action to protect the computer network and/or network node comprises one or more of:
   preventing one or more of network nodes from being switched off;
   switching on a firewall at the one or more of network nodes;
   warning a user of the one or more of network nodes that signs of a security breach have been detected; and/or
   sending a software update to the one or more of network nodes.

7. A computer apparatus comprising:
   a memory comprising computer-executable instructions; and
   one or more processors configured to execute the computer-executable instructions and cause the computer apparatus to perform a method of threat detection that causes the computer apparatus to:
   detect a new process that starts at a network node of a computer network;
   determine that said new process requires external code modules by processing the file contents of an executable image associated with said new process to retrieve a list of expected external code modules for the new process, wherein the list includes all external code modules that are used by the new process;
   observe the times at which one or more of the external code modules in the list of expected external code modules for the new process are loaded relative to a start of the new process;
   determine whether one or more external code modules that are not in the list of expected code modules are loaded for the new process;
   determine that usage of an external code module required by the new process is anomalous when the time elapsed between the start of the new process and loading of said external code module lies outside predetermined expected boundaries or said external code module was determined to be not in the list of expected code modules for the new process; and
   take further action to protect the network node and/or the computer network based on the determining that the usage of the external code module is anomalous.

8. The computer apparatus according to claim 7, wherein the new process comprises execution of one or more of: a code module, a dynamic load library, a shared object.

9. The computer apparatus according to claim 7, the one or more processors being further configured to determine whether a related executable image for the new process is known clean, wherein the determining whether the related executable image for the new process is known clean comprises determining whether the executable image satisfies one or more predetermined whitelisting criteria.

10. The computer apparatus according to claim 7, wherein the processing of the file contents of the executable image comprises one or more of: processing import tables, processing code, extracting various artefacts.

11. The computer apparatus according to claim 7, the one or more processors being further configured to determine whether the usage of an external code module is anomalous based on determining that the external code module belongs to a group of known processes having sufficiently similar properties on the basis of comparing file names of executable images for new processes and/or comparing portions of the file contents of the executable images for the new processes.

12. The computer apparatus according to claim 7, wherein the taking further action to protect the computer network and/or network node comprises one or more of:
   preventing one or more of network nodes from being switched off;
   switching on a firewall at the one or more of network nodes;
   warning a user of the one or more of network nodes that signs of a security breach have been detected; and/or
   sending a software update to the one or more of network nodes.

13. A non-transitory computer readable medium comprising instructions which, when run on a computer apparatus or server, causes the computer apparatus to perform a method of threat detection, the non-transitory computer readable medium comprising instructions to:
   detect a new process start at a network node of a computer network;
   determine that said process requires external code modules by processing the file contents of an executable image associated with said new process to retrieve a list of expected external code modules for the new process, wherein the list includes all external code modules that are used by the new process;
   observe the times at which one or more external code modules in the list of expected external code modules for the new process are loaded relative to a start of the new process;
   determine whether one or more external code modules that are not in the list of expected code modules for the new process are loaded;
   determine that the usage of an external code module required by the new process is anomalous when the time elapsed between the start of the process and loading of said external code module lies outside predetermined expected boundaries or said external code module was determined to be not in the list of expected code modules for the new process; and
   take further action to protect the network node and/or the computer network based on determining that the usage of the external code module is anomalous.

* * * * *